United States Patent
Lee

(10) Patent No.: US 8,126,399 B1
(45) Date of Patent: Feb. 28, 2012

(54) METHOD AND APPARATUS FOR IMPROVED AUTOMATIC BLUETOOTH DEVICE IDENTIFICATION FOR DATA EXCHANGE

(75) Inventor: Hanjin Lee, Skillman, NJ (US)

(73) Assignee: Koamtac, Inc., Princeton, NJ (US)

( * ) Notice: Subject to any disclaimer, the term of this patent is extended or adjusted under 35 U.S.C. 154(b) by 406 days.

(21) Appl. No.: 12/384,023

(22) Filed: Mar. 31, 2009

(51) Int. Cl.
*H04B 7/00* (2006.01)
(52) U.S. Cl. .................. 455/41.2; 455/41.3
(58) Field of Classification Search ......... 455/41.2–41.3
See application file for complete search history.

(56) References Cited

U.S. PATENT DOCUMENTS

2007/0105500 A1* 5/2007 Kim .................. 455/41.2
2010/0130132 A1* 5/2010 Lee et al. ............ 455/41.3

OTHER PUBLICATIONS

U.S. Appl. No. 11/515,636, filed May 10, 2007, Kim.

* cited by examiner

*Primary Examiner* — Lincoln Donovan
*Assistant Examiner* — John Poos
(74) *Attorney, Agent, or Firm* — Gorman Law Offices; Robert S. M. Gorman

(57) ABSTRACT

Provided are a method and an apparatus for searching neighboring Bluetooth devices through a portable terminal having a Bluetooth module. The inventive method addresses neighboring Bluetooth devices by establishing fixed device name and variable controller serial number, or other unique identifier.

9 Claims, 3 Drawing Sheets

Bluetooth barcode data collector

Unique Bluetooth Name Composition Device and Method

Bluetooth barcode data collector

Bluetooth barcode data collector

METHOD AND APPARATUS FOR IMPROVED AUTOMATIC BLUETOOTH DEVICE IDENTIFICATION FOR DATA EXCHANGE

BACKGROUND OF THE INVENTION

1. Field of the Invention

The present invention relates generally to an improved approach for automatic detection and synchronization in handheld electronic units such as cell phones, etc. that may have the need for add-on units to be connected thereto. Such devices may include barcode scanners, PDAs, printers, scanners, and the like. To this end, the present invention relates generally to a portable terminal with a Bluetooth® (hereinafter called Bluetooth) module, and in particular, to an improved method and apparatus for searching for Bluetooth devices in neighboring Bluetooth equipped portable terminals to enhance the speed and accuracy of the search by assigning a nickname to a Bluetooth management database in the portable data collector/terminal. Here, the nickname generally refers to a name assigned to a neighboring Bluetooth device by the portable terminal.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Hand held units such as computers, cell phones, personal digital assistants (PDAs) etc are becoming increasingly useful amongst consumers and industry. These devices often use Bluetooth, which is a technology for providing short range wireless communications. Bluetooth technology makes it possible to wirelessly connect Bluetooth devices within a relatively short range at low cost. In Bluetooth communication, radio frequencies are used to exchange voice and data signals between Bluetooth devices within a relatively short range without the need of physical cables. For example, when a mobile communication terminal and a laptop computer are each equipped with a Bluetooth module, they can be wirelessly connected each other, i.e. without using cables. Almost all types of digital devices such as personal digital assistants (PDAs), desktop computers, facsimiles (FAXs), keyboards, and joysticks can utilize Bluetooth communication if they have a Bluetooth module.

A device having a Bluetooth module searches neighboring Bluetooth devices and performs a pairing process with the searched Bluetooth device so that it can wirelessly communicate with the searched Bluetooth device(s). The pairing process is an authentication process in which an inter-device common link key defined in the Bluetooth interface standard is created to authenticate an inter-device common link. Bluetooth devices are widely used in various devices including cell phones and barcode readers. Bluetooth devices normally assign fixed device name to all devices with same model number. However, it becomes a challenging task distinguishing Bluetooth devices during paring process in cases where one pairs multiple Bluetooth devices with the same Bluetooth or device name.

Prior art attempts to address such limitations may be seen in documents such as U.S. patent application Ser. No. 11/515, 636 (Publication No. 2007/0105500, filed Sep. 5, 2006) which is hereby incorporated by reference in its entirety, offer only crude solutions for attempting to establish device connections interfaces for sending data. To this end, related prior art solutions have been hitherto limited to the provision of say, primitive naming constructs which do not allow for the successful, user-friendly naming of multiple devices which may have similar device identities. This is especially true because even if one were to say, have a host device (i.e., PDA, PC, etc.) distinguish neighboring (or slave) devices by adding an arbitrary, host-centric name for each device, and storing the same into a host database. Approaches directed as such are awkward and frequently exhibit stubborn technical issues such as miscommunication, and signal conflicts for several reasons, not the least of which involves the possibility of conflicting (redundant) names and the complexities of properly maintaining central naming databases. Given the various drawbacks related to prior art approaches to using multiple separate Bluetooth devices, there is clearly a need to provide for a more simplified and logical slave device-centric name assignation system that works within the limitations of multiple connectivity, without the aforementioned drawbacks.

SUMMARY OF THE INVENTION

An object of the present invention is to substantially solve at least the above problems and/or disadvantages of conventional systems and to provide at least the advantages below. Accordingly, an object of the present invention is to provide a method and an apparatus for searching neighboring Bluetooth devices through a neighboring device-centric portable interface or terminal within or proximate to a Bluetooth module-based neighboring device which can enhance the speed and accuracy of the search.

Another object of the present invention is to provide a method and an apparatus for searching neighboring Bluetooth devices through the use of a data collector in or proximate to a neighboring Bluetooth device, which can enhance the speed and accuracy of the search by adding a nickname field to a memory of the portable terminal.

According to one aspect of the present invention, a method is provided for registering a plurality of neighboring Bluetooth devices in a portable terminal having a Bluetooth module, the method includes acquiring addresses of the searched neighboring Bluetooth devices; assigning a nickname to a searched neighboring Bluetooth devices; and transmitting the nickname of the searched neighboring Bluetooth device with the host Bluetooth device.

According to another aspect of the present invention, a portable terminal/data collector having a Bluetooth module for acquiring, reading, and naming neighboring searched (i.e., slave) Bluetooth devices is provided that includes a memory unit for storing said resulting assigned name and for writing the assigned name of the searched neighboring Bluetooth device within the memory of the searched neighboring Bluetooth device(s) in their resident Bluetooth memory.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may necessarily not be set forth below, but may instead be appreciated by one skilled in the art.

BRIEF DESCRIPTION OF THE DRAWINGS

The above and other objects, features, and advantages of the present invention will become more apparent from the following detailed description when taken in conjunction with the accompanying drawings in which:

FIG. 1 is a diagram illustrating the inventive Bluetooth Name Composition Method for the naming of neighboring Bluetooth devices through the inventive Bluetooth-based portable terminal/module.

DETAILED DESCRIPTION OF THE PREFERRED EMBODIMENTS

Figure 1:
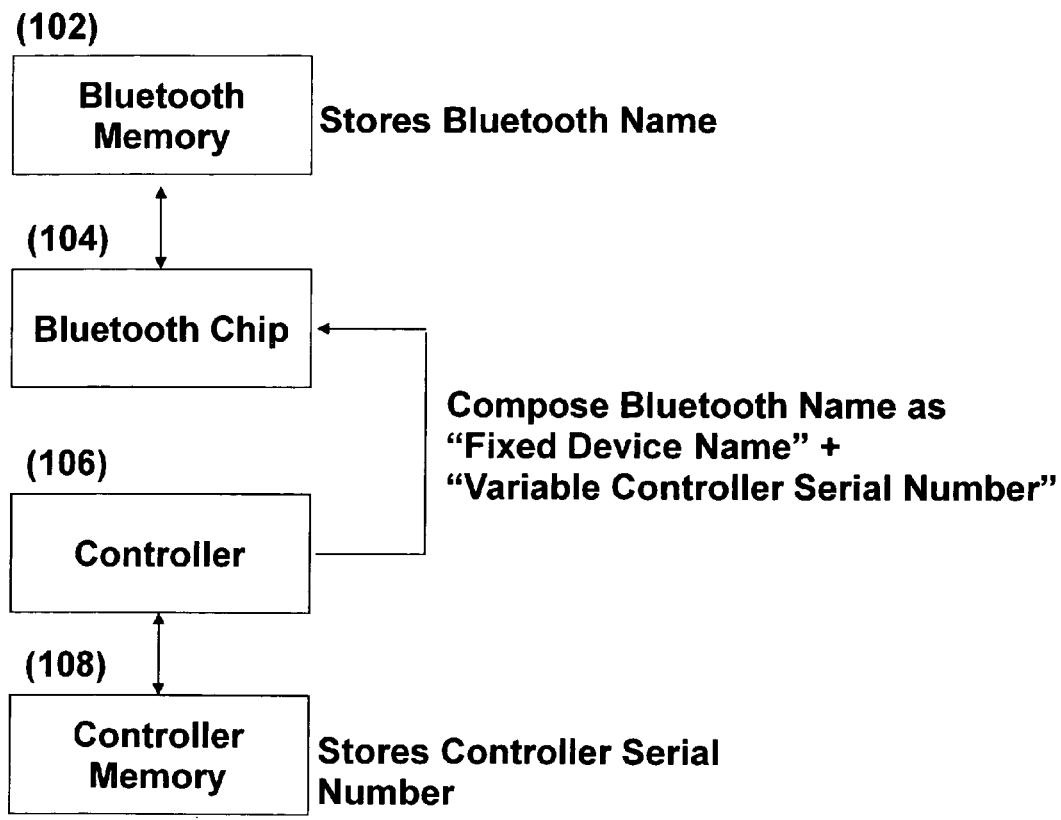

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Accordingly, the present invention introduces a new system and method that uniquely names, through a slave-centric data collector, a multiplicity of Bluetooth device names differently, device by device, in a logical (rather than arbitrary) fashion. To this end, the present invention introduces a method whereby Bluetooth devices are assigned a unique Bluetooth name, all of which may be assigned dynamically during any given Bluetooth initialization process. When provisioned in accordance with the particulars disclosed herein, there is no need for defining device nicknames from a central database on the Bluetooth host side because one can readily distinguish devices (even those of the same type) from the uniquely assigned Bluetooth device name.

In accordance with one aspect of the present invention, there is provided, at the broadest level, a system and method for the provision of communication across a plurality of wireless devices in a multiplicity of communication environments comprising: a portable data collector proximate to a host wireless device and at least one of a group of neighboring slave wireless devices, the portable data collector having a wireless module for reading unique identifier indicia of each neighboring slave wireless devices from a memory within each of the respective neighboring slave devices; a controller within the terminal/data collector for assigning unique, non-redundant assigned names respectively for each of the neighboring slave wireless devices based upon the identifier indicia of each respective said neighboring slave wireless devices, and for writing the assigned names of the neighboring slave wireless devices within a respective memory of the neighboring slave wireless devices; a controller memory for storing the assigned names within said portable data collector; and a communications module for communicating said assigned names to said host wireless device. In addition, the present invention further provides for a module for assigning said assigned name based upon said identifier indicia of each respective the neighboring slave wireless devices the identifier indicia are chosen from the group comprising at least a Fixed Device Name and a unique Variable Controller Serial Number, and wherein the wireless module and the communications module permit communication over different communication protocols, including Bluetooth, ZigBee, WiFi, and/or WiMax. Also, the controller may further include circuitry whereby the assigned name may be changed by a user of the portable data collector, and may also include a connected display and an input/output means for user interfacing and a user notification element, such as an audio or visual prompt.

Therefore, in one illustrative embodiment of the present invention, provision may further be made for a Bluetooth host (master) device to refer to a uniquely assigned device name in order to distinguish multiple Bluetooth devices with the same Bluetooth name. In doing so, the inventive approach may be implemented either as a discrete hardware unit that includes a data collector/controller and may be: (1) attached to or integral to a host Bluetooth device; (2) attached to or integral to any number of slave Bluetooth devices; or (3) may be a stand-alone intermediary device that functions as a hub of sorts between the host and slave devices. Alternatively, the inventive approach may also be implemented as software that may be integrated within any given number of Bluetooth devices by utilizing software that emulates the data collector/controller described herein, whereby the software itself utilizes its own unique serial number (e.g., by entering a serial number in an office package), and by methodically defining each neighboring Bluetooth device with unique a Bluetooth name through a serial number embedded in the respective software embedded therein. In either case, the inventive approach provides that the native serial number of the given Bluetooth-based slave devices will be shown, in conjunction with the device name, to a host device. When provisioned as such, the user may thereafter manually or automatically select a Bluetooth device for connection according to the created Bluetooth device names that may be listed on the host device.

With reference to FIG. 1, in one embodiment of the present invention, the Data Collector (which, in the illustrative case described here, is situated proximate to or on a host device) has a Bluetooth module so that it may search for and thereafter name neighboring Bluetooth-based slave devices through the composition steps executed by the inventive data collector. Specifically, the inventive data collector creates a unique Bluetooth name that would be stored in Bluetooth memory (102) through use of the native (preprogrammed) Bluetooth device serial number which is read and stored in Controller Memory (108). The Bluetooth device controller (106) may, in one embodiment, compose the unique Bluetooth name by say, concatenating the given model number (e.g., "Fixed Device Name") and device serial number (e.g., "Variable Controller Serial Number") of the neighboring device through Controller (106) via Controller Memory (108) and may thereafter store the resulting composition (nickname) in a Bluetooth memory (102) via Bluetooth chip (104). In alternative embodiments, it would be possible to use other unique device identifier indicia, such as the controller (106) ID (or a WiFi address in case of WiFi device), instead of the device serial number in (108). To that end, any combination of Bluetooth device name and unique Bluetooth device identifiers may be used to generate a unique Bluetooth device as outlined in the present invention. When provisioned as such, the portable terminal creates a slave-centric name for the searched neighboring Bluetooth devices. It is important to note that this slave-centric name assignation approach ensures that truly unique, logical names are created because regardless of whether devices are the same model/type or not, each will have a unique serial number that can distinguish each device better than say, and arbitrary (host-centric) numerical assignation like "XYZ Device #1", "XYZ Device #2", "XYZ Device #3", etc. Unlike this host-centric, arbitrary numerical assignation, the slave-centric name assignation approach reduces signal conflict, eliminates the need for centralized name databases, and further ensures that over time, naming redundancies are eliminated over time as slave devices are inevitably swapped in and out of the neighboring device arena.

As described above, the Data Collector must search for and properly name neighboring Bluetooth devices so as to properly connect a given neighboring salve Bluetooth device with the designated host Bluetooth device. The process of searching for neighboring Bluetooth devices may include a first operation of acquiring device classes (types), and unique serial number therein, and a second operation of forming the names of the neighboring Bluetooth devices according to the unique composition method that forms the nickname. In one case, the names of the neighboring Bluetooth devices are set by the inventive method according to a composition resulting from the combination of the device name and serial number automatically, although they may also be changed by the user, if desired. In either case, the composed names are different from the nicknames that the searching (host) device would assign to the neighboring Bluetooth devices, even if they are the same type and/or model of device. The searching and naming process may be established when a service for the neighboring Bluetooth device is connected for the first time, or alternatively, upon request by the user.

By way of illustration only, the above may be further understood in context of the following example which describes one exemplary set of devices, hand-held scanners such as the KDC200 available from KoamTac Inc., of Princeton, N.J., each of which are exemplary slave devices that may desire to connect to a host such as a PC. When this illustrative system is utilized, the native serial number of each slave device will be shown as follows: the first given KDC200 device, which has a serial number of say, "50" will be designated by the inventive Data Collector located on or proximate to the PC, as "KDC200[50]", while another neighboring slave KDC200 device with serial number of say, "100" would be shown as "KDC200[100]", and so on.

Figure 2:
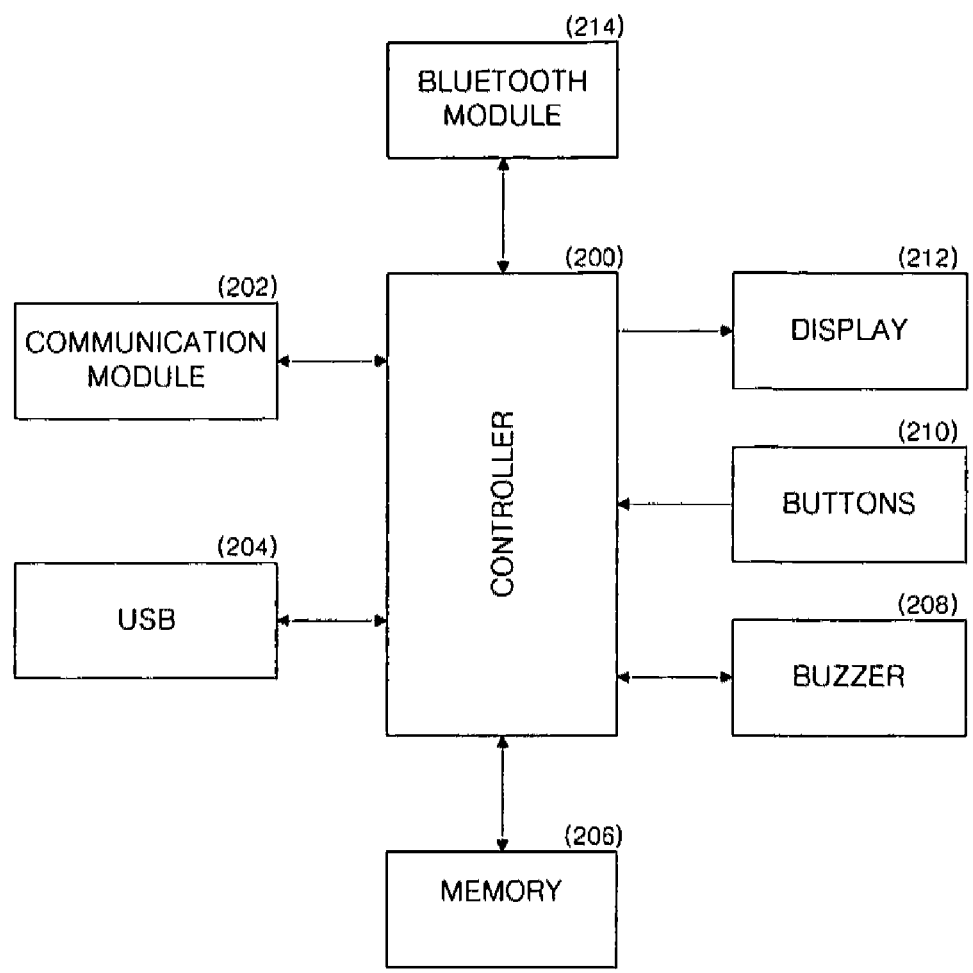
FIG. 2 is a block diagram of the inventive Bluetooth barcode data collector for a mobile communication terminal having a Bluetooth module according to the present invention.

FIG. 2 is a block diagram of a mobile communication terminal (Data Collector) having a Bluetooth module according to the present invention. Referring to FIG. 2, the mobile communication terminal includes a controller (e.g., a microprocessor unit (MPU)) 200, a serial communication module 202, a Bluetooth module 214, a memory unit 206 (such as Flash/SDRAM), a barcode or other menu display 212, an optional buzzer unit 208 (for distinguishing between successful/unsuccessful barcode or other reading, as well as device status), a scan or other type of keypad or buttons 210, an antenna (not depicted) and an optional USB port or communication module 204 (e.g, for connecting with the host device). The controller 200 controls an overall operation of the mobile communication terminal. For example, the controller 200 processes and controls data communication. In addition, the controller 200 performs a function for assigning a nickname for a searched neighboring Bluetooth device and identifying the searched neighboring Bluetooth device using the assigned nickname. Ongoing searching of neighboring (slave) Bluetooth devices may be used to determine whether the searched Bluetooth devices are newly-searched Bluetooth devices, so that they may be assessed in addition to any previously established Bluetooth device addresses. Either way, neighboring (slave) Bluetooth devices are identified through a data request, that is, signals (representing the model/device type and serial number (or other ID) are transmitted to neighboring Bluetooth devices to acquire the base indicia for forming the names of the neighboring Bluetooth devices, or for receiving the names if already formed and written into the slave memory, and stored at Memory 206.

The communication module 202 processes radio-frequency (RF) data signals that are transmitted and received through the antenna. For example, the communication module 202 converts baseband signals, into which Tx data have been channel-coded and spread, into RF signals and transmits the RF signals through the antenna. Also, the communication module 202 converts received RF signals into baseband signals and de-spreads/channel-decodes the baseband signals to recover original data.

Under the control of the controller 200, the Bluetooth module 214 searches for connectable neighboring Bluetooth devices and performs a pairing operation on the searched neighboring Bluetooth devices to acquire the addresses and name-related indicia of the searched neighboring Bluetooth devices. The Bluetooth module 214 may be merged into the controller 200. In this case, a merged controller having Bluetooth module function may be called a controller.

In one embodiment, the memory unit 206 may include a read only memory (ROM), a random access memory (RAM), and a Flash ROM. The ROM stores a variety of reference data and micro codes of a program for the process/control operation of the controller 200. The RAM is a working memory of the controller 200 that stores temporary data generated during the execution of various programs.

The display unit 212 displays information that includes an input/output means for user interfacing and a user notification element. These features may permit any manner of displaying status information generated during operations, numerals and characters, pictures, etc., and in the illustrative embodiment discussed herein, a barcode and menu display. The display unit 212 may alternatively include a color liquid crystal display (LCD)(not shown). In one embodiment, other particulars such as buttons or keypad 210 may include numeric key buttons of digits 0-9 and a plurality of function keys, such as a Menu key, a Cancel (delete) key, a Confirmation key, an End key, an Internet connection key, and Navigation keys to provide a key input date that corresponds to a key pressed by a user to the controller 200. A touch pad or a touch screen (not shown) may also be used as an input means. In this case touch elements in the touch pad or the touch screen correspond to the key buttons and keys in the key pad as described above. In a further embodiment, the Controller 200 may thereafter receive data (such as the illustrative bar code data) that may be converted for further processing by a host unit (such as the illustrative KDC200 or other device operated by a given user).

Figure 3:
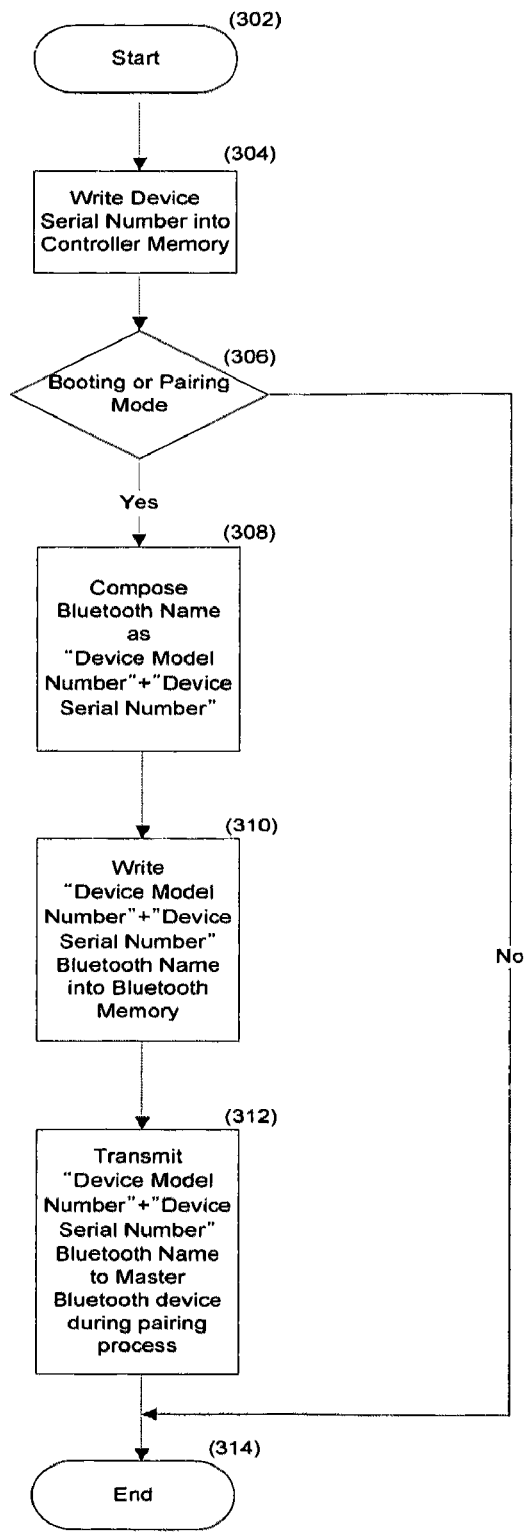
FIG. 3 is a flowchart illustrating a process for the inventive Bluetooth approach utilized in one embodiment of the inventive data collector when searching for and uniquely naming (nicknaming) a neighboring Bluetooth device.

FIG. 3 is a flowchart illustrating a process for searching and naming a neighboring Bluetooth device in a mobile communication terminal having a Bluetooth module according to the present invention. Referring then to FIG. 3 in greater detail, the controller 200, along with the associated components described above, execute the steps described below. Specifically, in step 304, a Bluetooth device serial number is programmed into non-volatile memory, such as flash memory, although it is noted that one can use other unique device identifiers or indicia, if available instead of a serial number, although it is further worth noting that in some cases certain implementation issues may need to be addressed when storing other unique device identifier into non-volatile memory, or when reading the same and thereafter when composing the unique identifier for each Bluetooth name inquiry process.

Nevertheless, in step 306, a given neighboring Bluetooth device enters into the inventive Bluetooth name composition process either by the booting or pairing processes found in such devices. Thereafter, in step 308, the inventive Bluetooth device composes a unique Bluetooth name using (reading and processing) the native (stored) device model number and device serial number of the neighboring Bluetooth device. In step 310, the resulting unique Bluetooth name is stored in the Bluetooth memory (102).

In step 312, a unique Bluetooth name is provided to the host Bluetooth device during the pairing (or updating) process. For example, if a device model number is say, "abcd", where there are two of such "abcd" Bluetooth devices, then they will necessarily have native serial numbers which can be are read as say, "100010" and "100090". As such, the master (host) Bluetooth device would find a Bluetooth device with an assigned name called "abcd100010" and a Bluetooth device called "abcd100090" during the pairing process because the inventive method and device would have already distinguished between the two same types of devices by having named them with the composed nickname that represents the two devices differently, based upon their device name and serial numbers.

Alternate embodiments of the present invention can also comprise computer readable codes or code segment(s) on a computer readable medium that executes all of the above described approaches. The computer readable medium includes data storage devices that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. In additional embodiments, it is explicitly contemplated within the scope of the invention described herein that it may be used in a multiplicity of wired and wireless environments, over different communication protocols, including Bluetooth, ZigBee, WiFi and/or WiMax. Although the practical applications of the above are legion, in one embodiment the illustrative application of the invention to cell phones may prove especially useful. For example, it may be possible to utilize cell phones for more than just voice communications. To this end, while the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for the provision of communication across a plurality of wireless devices in a multiplicity of communication environments comprising:
   a portable data collector proximate to a host wireless device and at least one of a group of neighboring slave wireless devices, said portable data collector having a wireless module for reading unique identifier indicia of each of said neighboring slave wireless devices from a memory within each of said respective neighboring slave devices;
   a controller within said terminal/data collector for assigning dynamically, during an initialization process, unique, non-redundant assigned names respectively for each of said neighboring slave wireless devices based upon said identifier indicia of each respective said neighboring slave wireless devices, and for writing said assigned names of the neighboring slave wireless devices within a respective memory of said neighboring slave wireless devices;
   a controller memory for storing said assigned names within said portable data collector; and
   a communications module for communicating said assigned names to said host wireless device.

2. The system of claim 1, wherein:
   said controller is a discrete hardware unit attached as one of the following of a stand-alone intermediary unit that functions as a hub between said neighboring slave wireless devices and said host wireless device, or attached to either said neighboring slave wireless devices or said host wireless device, and includes a module for assigning said assigned name based upon said identifier indicia of each respective said neighboring slave wireless devices said identifier indicia are chosen from the group comprising at least a Fixed Device Name and a unique Variable Controller Serial Number, and wherein said wireless module and said communications module permit communication over different communication protocols, including Bluetooth, ZigBee, WiFi, and/or WiMax.

3. The system of claim 2, wherein the controller includes circuitry whereby said assigned name may be changed by a user of the portable data collector, and further includes a connected display and an input/output means for user interfacing and a user notification element.

4. A method for registering a neighboring slave wireless devices through a portable terminal having a wireless module, the method comprising:
   reading unique identifier indicia of each neighboring slave wireless devices from a memory within each of said respective neighboring slave devices;
   assigning dynamically, during an initialization process, unique, non-redundant assigned names respectively for each of said neighboring slave wireless devices based upon said identifier indicia of each respective said neighboring slave wireless devices;
   writing said assigned names of the neighboring slave wireless devices within a respective memory of said neighboring slave wireless devices;
   storing said assigned names within said portable data collector; and
   communicating said assigned names to said host wireless device.

5. The method of claim 4, wherein:
   said assigning of said assigned name based upon said identifier indicia of each respective said neighboring slave wireless devices is based upon said identifier indicia being chosen from the group comprising at least a Fixed Device Name and a unique Variable Controller Serial Number, and wherein communications are provided through said wireless module and said communications module, each of which permit communication over different communication protocols, including Bluetooth, ZigBee, WiFi, and/or WiMax.

6. The method of claim 5, wherein:
   said assigning of said name is accomplished through a discrete hardware unit attached as one of the following of a stand-alone intermediary unit that functions as a hub between said neighboring slave wireless devices and said host wireless device, or attached to either said neighboring slave wireless devices or said host wireless device, and may be changed by a user of the portable data collector, and may be displayed through a connected display and processed via an input/output means for user interfacing and a user notification element.

7. A non-transitory computer-readable recording medium having recorded thereon a program for registering a neighboring slave wireless device of a portable terminal comprising:
- a first code segment for reading unique identifier indicia of each neighboring slave wireless devices from a memory within each of said respective neighboring slave devices;
- a second code segment for assigning dynamically, during an initialization process, unique, non-redundant assigned names respectively for each of said neighboring slave wireless devices based upon said identifier indicia of each respective said neighboring slave wireless devices;
- a third code segment for writing said assigned names of the neighboring slave wireless devices within a respective memory of said neighboring slave wireless devices;
- a fourth code segment for storing said assigned names within said portable data collector; and
- a fifth code segment for communicating said assigned names to said host wireless device.

8. The medium of claim 7, further comprising:
- a sixth code segment for assigning said assigned name based upon said identifier indicia of each respective said neighboring slave wireless devices wherein said identifier indicia are can be chosen from the group comprising at least a Fixed Device Name and a unique Variable Controller Serial Number, and wherein communications are provided through additional code which permits communication over different communication protocols, including Bluetooth, ZigBee, WiFi, and/or WiMax.

9. The medium of claim 8, further comprising:
- a seventh code segment for assigning, through a discrete hardware unit attached as one of the following of a stand-alone intermediary unit that functions as a hub between said neighboring slave wireless devices and said host wireless device, or attached to either said neighboring slave wireless devices or said host wireless device, said name according to any modifications inputted by a user of the portable data collector via an input/output means for user interfacing, and for displaying any related information through a connected display and for providing a user notification element.

\* \* \* \* \*